United States Patent [19]

Greenfield, Jr. et al.

[11] Patent Number: 4,458,829

[45] Date of Patent: Jul. 10, 1984

[54] SMALL BEVERAGE DISPENSER FOR COMMERCIAL USE

[76] Inventors: Irving E. Greenfield, Jr.; Ronald C. Jacobson, both of 8925 SW. 129th St., Miami, Fla. 33167

[21] Appl. No.: 247,742

[22] Filed: Mar. 26, 1981

[51] Int. Cl.³ ............................................. A47J 31/40
[52] U.S. Cl. ........................... 222/129.3; 222/146 HE; 222/282; 222/413; 198/670
[58] Field of Search .......... 222/129.3, 129.4, 146 HE, 222/413, 129.1, 129.2, 282, 290; 198/670, 534, 548, 558, 670

[56] References Cited

U.S. PATENT DOCUMENTS

| | | | |
|---|---|---|---|
| 3,465,123 | 9/1969 | Harris | 219/328 |
| 3,481,512 | 12/1969 | Scheffer et al. | 222/413 |
| 4,015,749 | 4/1977 | Arzberger et al. | 222/129.4 X |
| 4,194,651 | 3/1980 | Martin et al. | 222/129.4 |

Primary Examiner—Joseph J. Rolla
Assistant Examiner—Frederick R. Handren
Attorney, Agent, or Firm—Harvey B. Jacobson

[57] ABSTRACT

A beverage dispenser for use in a broad range of commercial food service operations which will consistently, accurately, economically and rapidly dispense beverages over extended periods in a dependable and substantially maintenance-free manner. The dispenser includes a cannister/auger assembly providing a completely closed product delivery path with absolute positional immobility. The dispenser also includes a system for dispersing moisture from the product delivery area which will assure complete removal of moisture. The beverage dispenser includes an adjustable device coupled to the auger to enable variation in the beverage strength while maintaining machine simplicity and a rapid water temperature recovery rate with the beverage dispenser being capable of simple, fool-proof, instantaneous disassembly.

11 Claims, 9 Drawing Figures

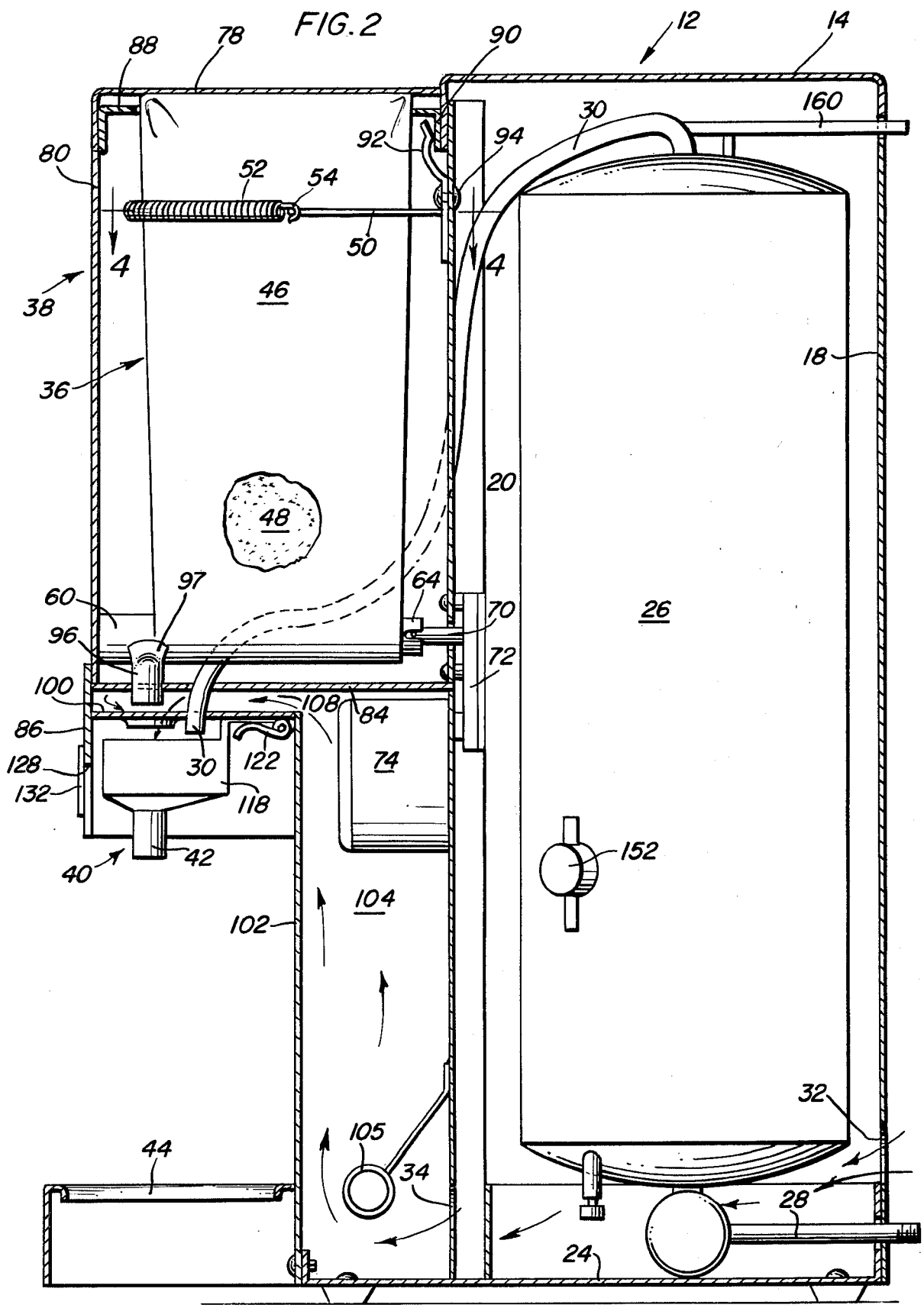

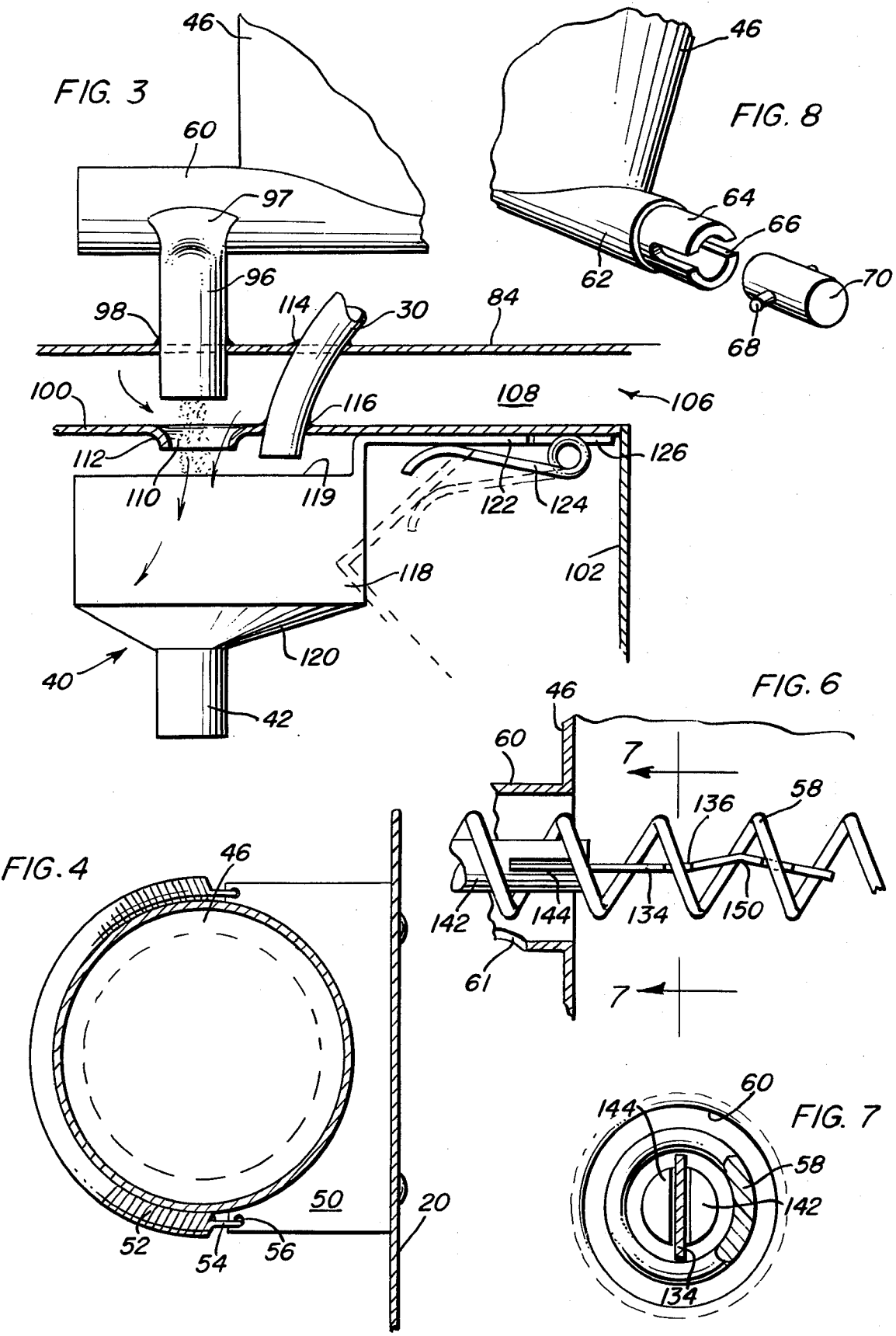

SMALL BEVERAGE DISPENSER FOR COMMERCIAL USE

CROSS-REFERENCE TO RELATED APPLICATION

The present invention relates generally to the same field of endeavor as our co-pending application U.S. Ser. No. 865,324, filed Dec. 28, 1977, for Demand Preparation Soluble Coffee Urn now U.S. Pat. No. 4,366,920 issued Jan. 4, 1983. and the disclosure in that application, the prior art discussed in the specification as well as the prior art cited during prosecution are incorporated herein by reference thereto.

BACKGROUND OF THE INVENTION

1. Field of the Invention

A beverage dispenser, having relatively small external dimensions, is adapted for commercial use and includes mechanisms for accurately and consistently dispensing a variable and predetermined quantity of food powder while maintaining machine simplicity and constructed to provide a rapid water temperature recovery rate and easy and quick disassembly and assembly.

2. Description of the Prior Art

U.S. Pat. No. 4,015,749, issued Apr. 5, 1977, to Arzberger et al discloses a typical prior art dispenser in which an auger is utilized to dispense a quantity of food product into a mixing chamber where it is combined with water and discharged into a cup or other vessel. The mixing chamber requires a structure providing a standing vortex of water with the food powder being discharged into the center of the vortex. In this patent, a heat sink is provided in an effort to control moisture conditions in order to alleviate the clogging problem prevalent in this type of machine. Other of the prior patents discussed in the specification of the above-mentioned co-pending application and cited during prosecution of that application disclose various types of dispensers by which beverages may be provided.

Notwithstanding various efforts to improve currently marketed dispensers, there remains a need for a dispenser which will consistently, accurately, economically and rapidly dispense a beverage over an extended period of time with minimum attention required by operating or maintenance personnel.

SUMMARY OF THE INVENTION

An object of the present invention is to provide a beverage dispenser which will consistently, accurately, economically and rapidly dispense a beverage over extended periods with minimal supervision by operating personnel and minimum maintenance.

The above object is accomplished by utilizing a unique apparatus for dispensing the food product in a completely closed product delivery path which includes a cannister/auger assembly with positional immobility and a structural arrangement which provides for dispersal of moisture from the product delivery area. The auger includes a structure enabling variation in the beverage strength and water temperature recovery rate is as rapid as possible and the assembly and disassembly of the dispenser is simple, fool-proof and substantially instantaneous.

Another object of the invention is to provide a beverage dispenser in which the closed product delivery path includes a hopper and hopper cover which closes the auger spout thus eliminating air movement within the product delivery path.

Still another object of the invention is to provide a cannister and auger which are immobilized by supporting engagement at four separate points.

Yet another important object of the invention is to provide a beverage dispenser in which moisture dispersal is obtained by creating a warm air flow and directing it to the critical area, but rather than radiating the convective current to and around the usually open product delivery area, the present invention employs a structure in which the warm air is confined to the mixing chamber area and its flow characteristics and associated structural characteristics will evacuate all moisture through the sides of the mixing chamber, thereby providing total dispersal of moisture from the product delivery area.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a vertical sectional view, on an enlarged scale illustrating the structural components of the present invention.

FIG. 3 is an enlarged fragmental view, partly in section, illustrating the association of the product drop tube, mixing chamber and water discharge tube.

FIG. 4 is a sectional view generally taken along section line 4—4 of FIG. 2 illustrating the retaining structure for the cannister.

FIG. 6 is a fragmental sectional view taken substantially upon a plane passing along section line 6—6 of FIG. 5 illustrating further structural details of the auger, adjustment device and tool for adjusting the adjustment device.

FIG. 7 is a transverse, sectional view taken substantially upon a plane passing along section line 7—7 of FIG. 6 illustrating further structural details of the auger and adjustment device.

FIG. 8 is a fragmental perspective view illustrating the driving connection between the auger and drive motor shaft illustrating the detachable drive connection therebetween.

DESCRIPTION OF THE PREFERRED EMBODIMENTS

Figure 1:
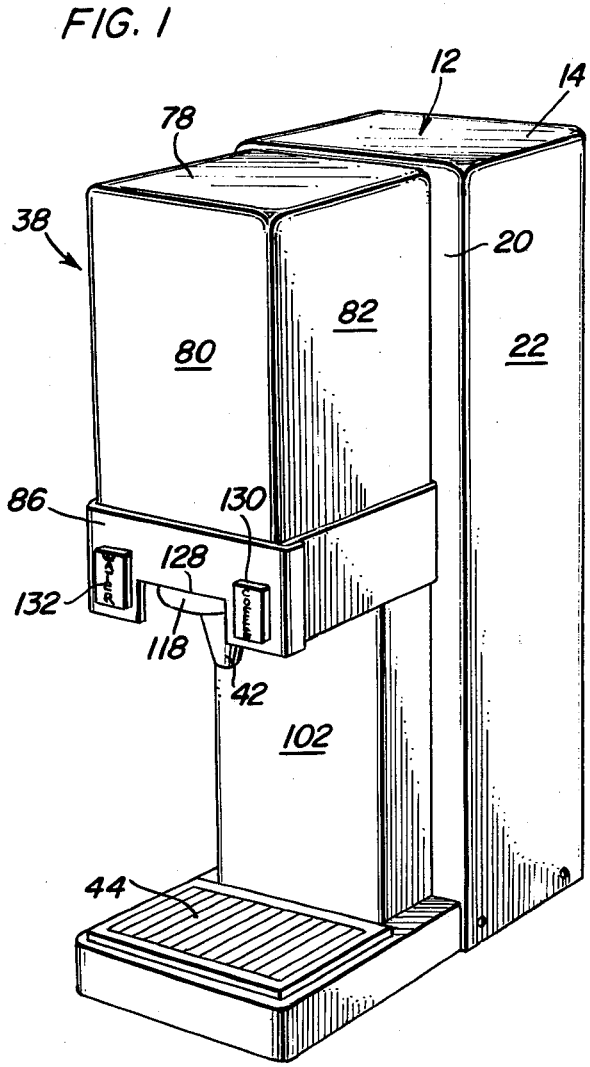
FIG. 1 is a perspective view of one embodiment of the beverage dispenser of the present invention.

Referring now to the drawings, the beverage dispenser of the present invention is generally designated by reference numeral 10 and includes a generally vertically disposed housing 12 including a top wall 14, rear wall 18, front wall 20, side walls 22 and a bottom member 24 which may be removably connected to the vertical walls by suitable fastening screws and the like to enable access to the interior of the housing 12. The shape and configuration of the housing may vary, but should remain as small as possible in order to satisfy the installational requirements. The major portion of the interior of the housing 12 is occupied by a vertically disposed hot water tank 26 having an inlet 28 at the bottom and an outlet 30 at the top. The rear wall 18 is provided with an ambient air inlet 32 adjacent the bottom thereof and the forward wall 20 is provided with an ambient air outlet 34 so that air passes through the bottom portion of the housing 12 and in contact with the lower portion of the tank 26 as indicated by the arrows in FIG. 2.

Mounted on the front wall 20 is a cannister/auger assembly generally designated by numeral 36, a removable cover 38 therefor and a mixing chamber 40 having a discharge spout 42 by which a beverage may be dispensed into a cup, glass or other receptacle which may be hand-held under the spout 42 or placed on a perforated tray 44 in alignment with the spout 42.

The cannister/auger assembly includes a generally cylindrical cannister or hopper 46 which tapers downwardly and is provided with an open upper end and which receives a quantity of powdered food product 48 therein which can be replenished. The cannister 46 is supported from the front wall 20 by a generally U-shaped plate or bracket 50 engaging a portion of the periphery of the cannister 46 with a tension coil spring 52 having its hook-shaped ends 54 engaged with apertures 56 in the ends of the bracket 50 to enable secure positioning and immobilizing of the upper end portion of the cannister 46, but enabling easy removal thereof when desired. The bracket 50 is secured to the front wall 20 in any suitable manner, such as by riveting, spot welding, or the like.

The lower end of the cannister 46 includes a spiral auger 58 therein with the auger extending transversely of the cannister 46 adjacent the bottom thereof and into an auger tube 60 at the lower end portion of the cannister 46. The opposite portion of the lower end of the cannister 46 is provided with an auger tube 62 receiving the drive end 64 of the auger which is in the form of a tubular member having a pair of longitudinal slots 66 extending from the free end thereof for receiving a pair of projecting lugs or pins 68 on the auger drive shaft 70 which projects from a gear box 72 that is associated with a drive motor 74 so that operation of the motor 74 will drive the shaft 70 through the reduction gear assembly or gear box 72 and the diametric opposed pins 68 will engage and drive the shaft 64. The driving interconnection between the shaft 70 and the hollow portion 64 of the auger 58 will support and stabilize the lower end of the cannister 46 when the inner ends of the slots or notches 66 come into engagement with the transverse pins 68, as illustrated in FIG. 8.

Figure 5:
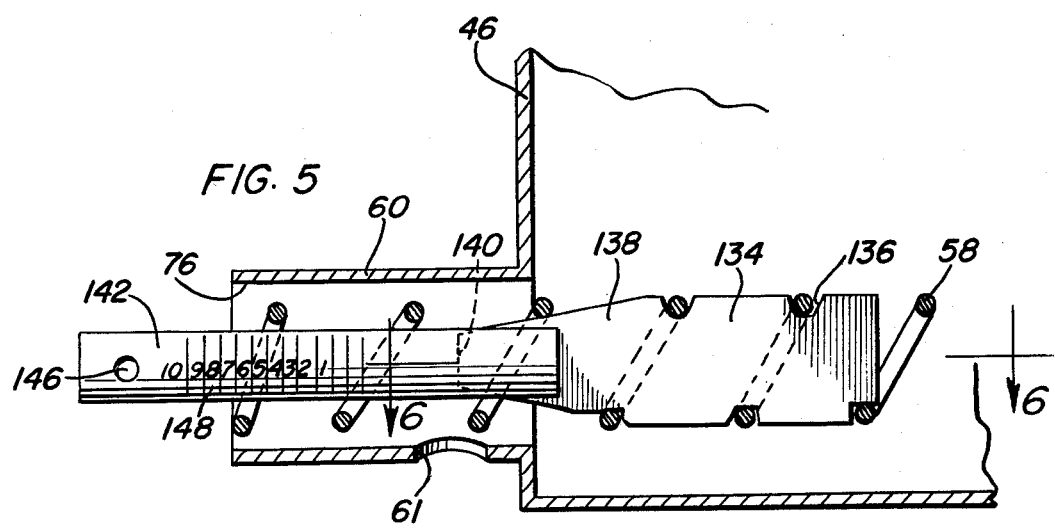
FIG. 5 is a fragmental sectional view illustrating the auger and cannister structure with an adjustment device associated with the auger to vary the strength of the beverage by varying the quantity of product dispensed.

The forward end of the auger tube 60 is open as indicated by reference numeral 76 in FIG. 5 with the cover 38 also serving to close the open end of the tube when assembled onto the housing 14. As illustrated in FIGS. 1 and 2, the cover 38 includes a top wall 78, a front wall 80 and side walls 82 oriented in perpendicular relation to each other with the front and side walls having lower edges resting on a horizontal partition plate 84 and telescopically received within the upper end of a vertical peripheral wall member 86 which is integral with the partition plate 84 as illustrated in FIGS. 1 and 2. The interior of the upper end of the cover 38 is provided with a frame member 88 in the form of an angle iron member which telescopes down over the upper end of the cannister 46, and the inner surface of the top 78 of the cover 38 will rest on and form a closure for the open upper end of the cannister 46. The inner portion of the frame 88 includes a depending flange 90 that is received under an upwardly opening spring clip 92 secured to the front wall 20 in any suitable manner, such as by rivets, fasteners, or the like 94. Thus, the upper inner edge of the cover 38 is secured to the front wall 20 of the housing 12 by the clips 92, whereas the lower end edge of the walls 80 and 82 are retained by their telescopic relation with the upper edge of the peripheral wall member 86 and by resting against the partition plate 84 as illustrated in FIG. 2 with the inner surface of the front wall 80 adjacent the lower end thereof being in engagement with the open end of the auger tube 60 when assembled in its normal position thereby forming a closure for the end of the auger tube 60.

The auger tube 60 includes an opening 61 aligned with a product drop tube 96 which depends through and is rigidly affixed to an opening 98 in the partition wall 84 and terminates slightly above a second partition plate 100 which is spaced below and parallel to the partition plate 84 as illustrated in FIGS. 2 and 3. The partition plate 100 extends to and is connected to the wall member 86 with the inner edge of the partition plate 100 being secured to the upper end of a vertical front wall 102 which is spaced from the vertical front wall 20 of the housing 12 as illustrated in FIG. 2 with this space, designated by numeral 104, providing an area for receiving the motor 74 and also providing a passageway for air exiting from the discharge opening 34 in the lower end of the front wall 20. The upper end portion of the wall 102 includes an opening 106 entering into space 108 between the partition 100 and the partition 84 so that air can pass upwardly through the passageway 104, through the opening 106 into the space 108. As illustrated in FIG. 3, the partition plate 100 is provided with an opening 110 defined by a peripherally downturned edge 112 which is in alignment with the discharge end of the product tube 96, but spaced slightly therebelow, so that air in the space 108 can pass downwardly through the opening 110 as indicated by the arrows in FIG. 2. Also, the discharge pipe or tube 30 from the hot water tank 26 passes down through an opening 114 in the partition wall 84 and also an opening 116 in the partition wall 100 so that both food product and water will be discharged into the mixing chamber 40.

The mixing chamber 40 includes a generally cylindrical, cup-shaped member 118 having an open upper end underlying and in alignment with the lower end of the water discharge pipe or tube 30 which terminates just below the partition plate 100 and the opening 110 for receiving water and food product. The bottom of the cup-shaped receptacle 118 is inclined downwardly and inwardly as at 120 generally in the form of a funnel-shaped member and terminating at its lowermost extremity in the beverage discharge spout 42. The inner upper edge of the receptacle 118 is provided with an extension plate 122 which is received under and retained detachably by a spring clip 124 attached to the inner edge portion of the partition wall 100 as at 126 in any suitable manner so that by pulling downwardly on the spout or forward portion of the receptacle, the receptacle can be easily removed for cleaning and can be likewise reassembled easily by merely sliding the projecting flange or plate 122 under the spring clip 124. As illustrated, the peripheral wall 86 extends down to a level just above the lower end of the beverage discharge spout 42 with the forward portion of the wall 86 being cut away as at 128 to enable easy access to the receptacle 118 to facilitate removal and replacement thereof. Also, manually actuated switch buttons 130 and 132 are incorporated into the side edge portions of the peripheral wall member 86 to operate the dispenser by closing the contacts in a switch. The electrical system for operating the dispenser is not shown inasmuch as it is conventional in and of itself.

FIGS. 5, 6 and 7 disclose an adjustment mechanism associated with the auger 58 in order to vary the beverage strength. The adjusting mechanism includes a plate 134 in the form of a spoiler which extends diametrically of the spiral rod auger 58 and includes notches 136 in the edges thereof which are offset in relation to each other for receiving the convolutions of the spiral auger. The end of the plate 134 adjacent the auger tube 60 is tapered as at 138 and terminates in a transversely extending end edge 140. An adjusting tool 142 in the form of a rod-like structure has a slotted end 144 telescoped over the end 140 of the plate 134. The opposite end of the rod-like tool 140 is provided with a transverse pin 146 to define a handle for rotating the plate 134 in relation to the auger 58 with such rotation causing longitudinal movement of the plate 134 within the interior of the auger 58. Graduations and indicia 148 are provided on the tool 142 for registry with the end of the auger tube 60 to provide an indication as to the position of the plate 134, thus providing an indication as to the strength characteristics of the beverage provided by the dispenser. The plate or spoiler is moved longitudinally of the auger and varies the strength of the beverage by controlling the amount of powder dispensed by the auger. As the spoiler plate is moved to the rear of the auger, it opens more of the frontal area and allows more powder to be collected for dispensing, whereas movement of the spoiler plate 134 towards the auger tube 60 will reduce the frontal area and reduce the powder dispensed upon each increment of rotation of the auger. As illustrated in FIG. 6, the plate 134 is provided with an offset portion 150 which will assure that the edges of the notches 136 will frictionally engage the auger 58 but still enable rotation of the spoiler plate 134 about its longitudinal axis. While a plate-like spoiler has been illustrated, in another embodiment, not disclosed in the drawings, a tapered plug of circular cross-sectional configuration may be longitudinally adjustable in the auger with the plug having grooves in the periphery thereof receiving the convolutions of the auger 58 with the plug being rotated in the same manner to vary the amount of food powder dispensed.

In order to provide the fastest possible water temperature recovery rate without increasing the tank size and heating element wattage, the present invention utilizes a quick response thermostat 152 in the tank 26 mounted on the exterior thereof in a conventional manner with the tank including an inlet tube 154 connected with the inlet pipe 28 and terminating in a curved discharge end 156 which extends generally laterally and discharges precisely at the quick response thermostat so that cool water entering the tank 26 will engage the thermostat 152. Thus, as soon as water is discharged through the discharge tube 30, replacement water entering the tank will be directed at the thermostat 152 thereby immediately activating the heating element, supplied by electrical energy through the electrical conduit 158, to rapidly heat the incoming water to maintain the water in the tank at the desired temperature at which the thermostat is set. The tank also includes a safety outlet 160 at the top provided with a safety relief valve of conventional construction to assure that excessive pressure would not rupture the tank.

While the single product dispenser of this invention has external appearance characteristics similar to known dispensers due to limitations imposed by the practical and functional demands of the machine, this dispenser is significantly different in that it operates properly over extended periods of time with little or no attention by operating personnel or maintenance personnel other than replenishing the food product as it is used. The dispenser operates consistently, accurately, economically and in an efficient manner thereby adapting it for institutional users. The functions of the dispenser are accomplished by providing a unique structure that produces greater, more reliable flows of product and water, higher and quicker water temperature recovery rate, better dehumidification, simplicity and freedom from clogging. The embodiment of the dispenser includes selection buttons for coffee and hot water, with hot water being discharged regardless of which button is pressed. In another embodiment, an iced tea dispenser could be provided which does not include a water tank or heater since it would be connected directly to a tap water line with the mixed tea at ambient temperature being dispensed into a glass over ice.

This dispenser will satisfy the specific needs of a broad range of commercial food service operations and particularly in a much greater variety of institutional locations. In addition to use in hospitals and nursing homes, the beverage dispenser is also especially useful when installed in restaurants, fast food facilities, in-plant feeding establishments, prisons, room-service kitchens, cafeterias and any other place which requires high capacity and high reliability and the dispenser requires only conventional electrical and plumbing connections.

The dispenser of this invention effectively satisfies the four major functional criteria which include perfect dispensing of the food product, variable beverage strength without machine complexity, fast as possible water temperature recovery rate and simple, fool-proof, instantaneous disassembly.

Because of the dust element in all food powders, their highly hygroscopic nature and the presence of mixing water, steam and ambient moist air, there has been an ongoing problem of powder particles collecting in the dispensing area and eventually clogging the dispenser. This dispenser has solved these problems in dispensing of the food powder by providing a completely closed product delivery path, a cannister/auger assembly with positional immobility and a total dispersal of moisture from the product delivery area. To provide a completely closed product delivery path, all air movement within the product delivery path has been eliminated, particularly during powder dispensing. This function is obtained by the cannister cover front wall 80 closing the outer end of the auger tube 60 and the product outlet 61 in the bottom of the tube 60 is nested in and engaged by the upper end of the product drop tube 96 which flares outwardly into a saddle-like arrangement 97. This arrangement has completely stopped accidental dispersion of powder "fines" which has always occurred previously and which is the cause of the deposit which eventually clogs the machine. Also, blocking any outlets for air within the product delivery path creates a "solid" unmoving air column which has no way to exit and physically resists any entrance of air from the mixing chamber.

The cannister/auger assembly enables quick and easy filling, cleaning and maximum product capacity and minimum servicing problems. Because of auger motor torque, rotation of the auger screw, removal of the cannister and motion associated with filling and delivering of the powder, previously known hoppers or cannisters have never been positively fixed or immobilized thus causing leaks, spills, inaccurate portions, "dusting" and powder presence which contributes to machine clogging. In this invention, the cannister is immovably held at four separate places including the spring clip structure 92 at the upper end, the interface between the product drop tube 96 and the auger tube 60, the auger motor drive shaft interface illustrated in FIG. 8 and the hopper cover contact as shown in FIG. 2. Each of these supporting and contacting points or elements supports the assembly and provide perfect position and alignment.

Figure 9:
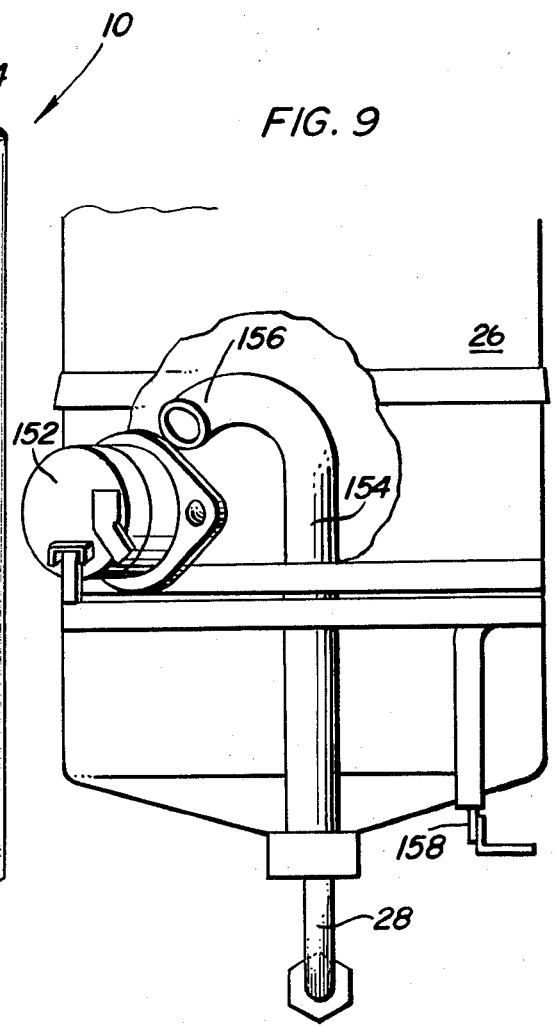
FIG. 9 is a fragmental view of the lower portion of the hot water tank illustrating the association of the components for fast temperature recovery.

Total dispersal of moisture from the product delivery area has been successfully solved by using the standard technique of creating a warm air flow with air entering through the opening 32, passing through the opening 34 and into the space 104 which has a heating element 105 at the lower end thereof thus providing a chimney effect. However, rather than radiating convective current through and around the usually open product delivery area, in this arrangement, the hot air flow is confined to the mixing chamber area and its flow is utilized to evacuate all moisture through the lowered sides 119 of the mixing chamber or funnel-shaped member 118.

The hopper cover 38 serves several unique purposes other than acting as a closure for the dispenser. As discussed previously, it closes and seals the normally open auger tube 60 thus effectively protecting the food product from outside contamination and moisture intrusion. Also, it prevents dispersal or "dusting" of the food product through the normally open auger tube as well as eliminating, in conjunction with the product drop tube, air movement through the auger tube 60 which is the main cause of the powder dispersion which leaves deposits on the outlet tube and causes clogging. Further, the hopper cover creates, together with the product drop tube, an unmoving air mass within the product delivery path which tends to prevent the entrance of moisture from the mixing chamber thereby confining the moisture to the mixing chamber and thus insuring its total evacuation through the vented mixing chamber. Further, the hopper cover locks the auger/cannister assembly securely against the motor shaft and keeps it properly aligned. The hopper cover is positioned and retained by passive structure which fit it exactly in place to seal the auger tube and close the machine in such a way that it cannot be accidentally dislodged or removed and no tools or fasteners are required to retain the cover in place or to enable the cover to be removed.

The product drop tube 96 serves several purposes besides acting as a guide to direct the food powder into the mixing chamber. The product drop tube has the upper saddle end 97 in contact with the auger tube 60 thereby creating a closed relationship that prevents powder dispersion at the discharge outlet 61 in the tube 60 thereby reducing the possibility of clogging. Also, the product drop tube 96 prevents air movement within the auger tube 60 and inhibits "dusting" on itself and adjacent machine parts that result in clogging. Additionally, the product drop tube when combined with the cannister or hopper cover provides an unmoving air mass within the product delivery path which tends to prevent the entrance of moisture from the mixing chamber, thus confining it in the mixing chamber, and thus insuring its total evacuation through the vented mixing chamber. Further, the product tube is an element of the system to position, support and perfectly align the auger/cannister assembly.

The multi-part system for positioning, supporting and perfectly aligning the auger/cannister assembly is constructed primarily of components which have a different primary function, namely, the cannister or hopper cover, the product drop tube and the auger motor shaft. Of these elements, the product drop tube and the auger motor shaft are passive and this system requires no tools for removal or placement of the auger/cannister assembly and no special procedures or operator training are required for removal or replacement of the auger/cannister assembly.

The vented mixing chamber dehumidification system directs the warm air flow to the mixing chamber through the opening 106 and the openings 110 in partition 100 with the welded or sealed relationship between the product drop tube 96 and the partition 84 at 98 and the welded or sealed relationship between the water tube 30 and the partition plate 84 at 114 confines the hot air to space 108 before it passes down through opening 110. The warm air flow collects all intruded moisture within the vented mixing chamber and completely evacuates this moisture through the lowered sides 119 of the mixing chamber thus venting moisture from the mixing chamber.

Commercial application of beverage dispensers requires variable beverage strength which usually has been accomplished by providing extra components, additional electrical circuits or internal replacements, but in order to maintain the size and function of the present dispenser, conventional procedures for varying beverage strength cannot be used. In this dispenser, an adjustable assembly is incorporated into the auger with this adjustment varying the strength of the beverage by controlling the amount of powder dispensed by the auger. As the spoiler plate 134 is moved longitudinally of the auger 58, it varies the frontal area and allows more or less powder to be collected for dispensing. The longitudinal position of the spoiler plate 134 is varied by using the tool 142 thereby enabling variation in beverage strength without the use of additional electrical devices, such as timers, potentiometers, and the like, and further eliminates the replacement of basic components such as aguer motors for adjusting dispensing speed or the augers themselves to adjust the amount of food powder dispensed. This arrangement also eliminates the necessity of attempting to vary water flow which is used in some situations and is substantially more complicated since it involves the use of a different water tank, water control valves, float systems, and the like. The variation in the beverage strength provided by the present invention is quite simple and easy to adjust with the structure eliminating complicated and expensive arrangements.

The speed and output capacity of the dispenser are dependent on water quantity available at a predetermined temperature. Usually, in order to provide increased capacity, the tank size would have to be increased or the wattage of the heating element would have to be increased, but these procedures would be detrimental to the space requirements and available amperage may not be sufficient. Thus, in this invention, a quick response thermostat 152 is used and is precisely positioned at the exact point at which the water inlet 156 will deposit cool water entering the tank 26 as illustrated in FIG. 9. This arrangement together with precisely planned placement of all components provides the fastest possible heating cycle to maximize the amount of fully heated water which can be produced by the tank space and electrical capacity available. Also, this arrangement avoids the problem of turbulence which has always accompanied efforts to produce large amounts of hot water in a small tank with the turbulence resulting in very poor temperature stratification which reduces the output potential of such a system. With this arrangement, the smallest possible storage tank is used along with the lowest possible electrical input with least amount of water turbulence and best possible temperature stratification of stored water is obtained.

In order for a dispenser to be practical for its intended purposes, it must be able to be filled, cleaned and serviced without special knowledge or equipment. In this machine, the cannister cover, drip tray and mixing chamber can be quickly removed in a very few seconds to allow instant access for cleaning, filling and servicing without disturbing, disassembling or touching any operating components. This is done without requiring any tools or the use of any fastener by lifting off the cover, sliding out the drip tray and pulling downwardly and outwardly on the mixing chamber with the reverse procedure being utilized to reassemble the components. The cannister/auger assembly can also be taken out and returned in perfect alignment merely by releasing and fastening the spring 52 and all of the operating components including the auger motor, the water tank with heating elements, the push buttons and a solenoid valve are located interiorly of the dispenser and are easily accessible.

The push button switches are of low voltage, long life, interiorly lighted push buttons and are quite longlived, require very little electrical energy and are much more visible than non-lighted switch buttons. The integrated arrangement of the unique components of this dispenser cooperate to meet the physical and operational requirements and provides a unique beverage dispenser satisfying the requirements of this type of installation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A beverage dispenser for discharging a beverage into a container comprising a mixing chamber having a discharge spout for discharging a beverage from the mixing chamber into a container, means depositing a quantity of powdered food product into the mixing chamber, means depositing a quantity of water into the mixing chamber for mixing with the food product and discharging a beverage from the discharge spout, and means dispersing moisture from the area where the powdered food product is deposited into the mixing chamber, said means depositing a quantity of powdered food product including a closed product delivery path to prevent the intrusion of moisture and eliminating air movement within the product delivery path, said means dispersing moisture including means providing flow of warm dry air downwardly through the area where the powdered food product is deposited into the mixing chamber for entraining any moisture therein, said means depositing a quantity of powdered food product into the mixing chamber including an auger rotatably driven about a longitudinal axis, and means adjustably mounted with respect to and rotatable with the auger for varying the quantity of food product discharged by the auger during a predetermined rotational movement thereof, said auger being a spiral rod, said adjustment means including a flat diametric plate disposed within the spiral rod and including notches along opposed edges thereof receiving the convolutions of the spiral rod forming the auger, and tool means engaging the adjustable plate interiorly of the rod for rotating it in relation to the auger to move the plate longitudinally of the auger to vary the quantity of food product collected and conveyed by the auger during each increment of rotation thereof.

2. The dispenser as defined in claim 1 wherein said means depositing water into the mixing chamber includes a water tank communicated with a bottom entering water supply pipe, heating means within the tank and a discharge pipe communicated with the upper end of the tank and extending into the mixing chamber, said water tank including a thermostat mounted thereon with the water inlet into the tank including a discharge pipe positioned in alignment with and directed toward the thermostat whereby incoming cool water will be directed toward the thermostat for actuating the heating means promptly upon intake of cool water thereby reducing the recovery time for the cool water to be heated to a predetermined temperature.

3. The structure as defined in claim 1 wherein said means providing flow of warm dry air includes a vertical passageway communicated with the area where the food product is deposited into the mixing chamber, means heating the air in the passageway to provide a flow force to the air in the vertical passageway, said mixing chamber including a funnel-shaped receptacle having recesses in the side edges thereof to enable moist air to be discharged therefrom, said warm dry air passing directly through the area where the powdered food product is deposited prior to it entering the mixing chamber so that air in the area where the powdered food product is deposited will be warm and dry thereby eliminating absorption of moisture by the food product in this area.

4. The dispenser as defined in claim 1 wherein said means providing flow of warm dry air includes an air space having a lower air inlet and an upper air outlet communicating with the area where the food product is deposited and heating means in said air space to provide a convective air flow directed downwardly into the area where the food product is deposited to entrain and absorb any moisture in this area and to prevent intrusion of moisture into this area when depositing water into the mixing chamber.

5. The dispenser as defined in claim 4 wherein said means depositing a quantity of powdered food product into the mixing chamber includes a partition plate overlying the mixing chamber and having an aperture therein aligned with the mixing chamber, a food product discharge tube aligned with the aperture and spaced from the periphery thereof to provide an air passageway downwardly between the aperture in the partition plate and the food product discharge tube, said means depositing a quantity of water into the mixing chamber discharging water below the partition plate whereby down flow of air through the aperture will preclude intrusion of moisture upwardly through the aperture in the partition plate thereby preventing contact between moisture associated with the mixing chamber and the food product being discharged from the tube.

6. A beverage dispenser for discharging a beverage into a container comprising a mixing chamber having a discharge spout for discharging a beverage from the mixing chamber into a container, means depositing a quantity of powdered food product into the mixing chamber, means depositing a quantity of water into the mixing chamber for mixing with the food product and discharging a beverage from the discharge spout, and means dispersing moisture from the area where the powdered food product is deposited into the mixing chamber, said means depositing a quantity of powdered food product including a closed product delivery path to prevent the intrusion of moisture and eliminating air movement within the product delivery path, said means for delivering a product including a storage cannister for a quantity of product, an auger and auger tube in the lower end of the cannister with one end thereof to engage an auger drive shaft and the other end including a discharge opening communicated with and supportingly engaged by a product drop tube rigidly supported from a partition plate, the end of the auger tube being open and a cannister cover enclosing the cannister and engaging the open end of the auger tube to prevent ingress of moisture and egress of food product.

7. The dispenser as defined in claim 6 wherein said cannister is secured in place by a bracket structure attached to the dispenser and a spring attached to the bracket and encircling the cannister to removably secure the cannister in place, and means releasably securing the upper portion of the cannister cover to the dispenser to retain it in position and enable removal thereof for removing the cannister and assembling the cannister.

8. A beverage dispenser for discharging a beverage into a container comprising a mixing chamber having a discharge spout for discharging a beverage from the mixing chamber into a container, means depositing a quantity of powdered food product into the mixing chamber, means depositing a quantity of water into the mixing chamber for mixing with the food product and discharging a beverage from the discharge spout, and means dispersing moisture from the area where the powdered food product is deposited into the mixing chamber, said means depositing a quantity of powdered food product including a closed product delivery path to prevent the intrusion of moisture and eliminating air movement within the product delivery path, said means dispersing moisture including means providing flow of warm dry air downwardly through the area where the powdered food product is deposited into the mixing chamber for entraining any moisture therein, said means providing flow of warm dry air including an air space having a lower air inlet and an upper air outlet communicating with the area where the food product is deposited and heating means in said air space to provide a convective air flow directed downwardly into the area where the food product is deposited to entrain and absorb any moisture in this area and to prevent intrusion of moisture into this area when depositing water into the mixing chamber, said means depositing a quantity of powdered food product into the mixing chamber including a partition plate overlying the mixing chamber and having an aperture therein aligned with the mixing chamber, a food product discharge tube aligned with the aperture and spaced from the periphery thereof to provide an air passageway downwardly between the aperture in the partition plate and the food product discharge tube, said means depositing a quantity of water into the mixing chamber discharging water below the partition plate whereby down flow of air through the aperture will preclude intrusion of moisture upwardly through the aperture in the partition plate thereby preventing contact between moisture associated with the mixing chamber and the food product being discharged from the tube, said mixing chamber being a funnel-shaped member having an open upper end spaced below the partition plate to enable discharge of air and moisture laterally of the mixing chamber below the partition plate thereby providing a flow path for convective airflow so that warm dry air may pass downwardly through the aperture in the partition plate and outwardly of the upper end of the mixing chamber below the partition plate thereby isolating the food product from contact with moisture laden air.

9. The dispenser as defined in claim 8 wherein said means depositing a quantity of powdered product includes a tubular member having a rotatable auger therein with the tubular member being communicated with a supply of food product and communicated with the discharge tube, a spiral auger rod rotatably mounted in the tubular member for conveying food product longitudinally thereof, a diametric plate positioned interiorly of the spiral rod and including edge notches engaged with the inner surface of convolutions of the spiral rod whereby rotation of the plate within the spiral rod will enable longitudinal adjustment of the plate in relation to the spiral rod whereby the spiral rod may rotate within the tubular member without interference between the plate and tubular member.

10. The dispenser as defined in claim 9 wherein said plate includes and end portion extending diametrically of the spiral rod and a tool having a groove in the end thereof insertable longitudinally in the spiral rod to engage the end of the plate to rotate the plate in relation to the spiral rod to enable adjustment of the longitudinal position of the plate within the spiral rod.

11. The dispenser as defined in claim 10 wherein said means depositing water into the mixing chamber includes a water tank communicated with a water supply, heating means within the tank, a discharge pipe communicated with the upper end portion of the tank and extending into the mixing chamber below the partition plate, a thermostat mounted on the tank controlling the heating means, said water supply pipe including an inlet directed at the thermostat for discharging incoming cool water onto the thermostat for actuating the heating means promptly upon entry of cool water into the water tank.

* * * * *